Dec. 17, 1957 — E. RABAS — 2,816,730

SHUT-OFF VALVE

Filed April 15, 1952

Inventor:
EDUARD RABAS
BY:

United States Patent Office 2,816,730
Patented Dec. 17, 1957

2,816,730

SHUT-OFF VALVE

Eduard Rabas, Wiesbaden-Biebrich, Germany

Application April 15, 1952, Serial No. 282,331

Claims priority, application Germany April 20, 1951

1 Claim. (Cl. 251—328)

The invention relates to shut-off valves of the kind having a slideable stop plate apertured to provide a flow opening and sealed by a packing means.

Various constructions of such shut-off valves are known in which the flow control plate is formed as a completely flat plate, having a bore or flow opening corresponding to the narrowest cross-section of the base in the valve body and mounted between two interchangeable packing rings which are under a certain initial tension. These valves are known in the art by such names as "disc-type shut-off valves" and "flat plate valves."

Shut-off valves of the aforesaid type are characterised by simplicity of construction and operation and present a number of advantages in practice as compared with other valve constructions. However, they do present the disadvantage that in the intermediate positions between the "closed position" and the "open position" of the valve, there is uncovered, to the medium to be conveyed through the valve, a passage in the lower pocket of the valve housing, so that such valves are of little value in conduits for conveying contaminated liquids, crystallising liquids or dust-laden gases, because in time the lower pocket of the housing becomes clogged. Such a valve is shown in Figure 1 of the accompanying drawing, in which the flat closure plate of the valve is indicated at 4, the flow opening thereof at 5 and the housing pocket at 6. It will be seen from the arrows shown in this figure that foreign particles can penetrate into the housing pocket 6 in one of the intermediate positions between the open position and the closed position. In this way, the housing pocket can gradually become filled with solids and the movability of the stop plate 4 can be thereby impeded or made impossible.

The main object of the present invention is to provide a shut-off valve by which the aforementioned disadvantages are avoided. More particularly, the object of the invention is to provide a shut-off valve in which any access of foreign particles to the valve pocket is prevented in every position of the flow control or obturating plate.

According to the invention, in a shut-off valve with a flow control or obturating plate, which cooperates with a packing, the packing is lengthened by an extension piece so that the flow opening formed in the said plate is sealed thereby in leak-proof manner with respect to the housing during the entire movement of the said plate.

In accordance with a preferred embodiment, the packings are interchangeably mounted on both sides of a plane-parallel flow control plate and their extensions are projected to below and thus to surround the aperture in the plate when the latter is in the closed position.

The extension of each packing is conveniently U-shaped. The packings themselves may consist of a part which surrounds the flow opening and which preferably corresponds to the shape of the latter, and a closed extension connected therewith. The packings and their extensions may be fitted in interchangeable manner in the flow control plate, which is then preferably thickened, and cooperate with tracks in the housing which are advantageously machined flat, or they can be arranged on surfaces of the housing and cooperate with a plane-parallel flow control plate. The packing system may consist of resilient or non-resilient packing material.

It is expedient to make the housing of the shut-off valve in two parts and to make the external diameter of the packing system in the direction of movement of the stop plate of such dimensions that it is at the most equal to the internal diameter of a separation plane of the two parts of the housing, said separation line being preferably a smooth curve e. g. a circle and sealed by means of a projection on the one part cooperating with a recess on the other part.

The invention will be more fully explained by way of example with reference to the accompanying drawing in which.

Figure 1:
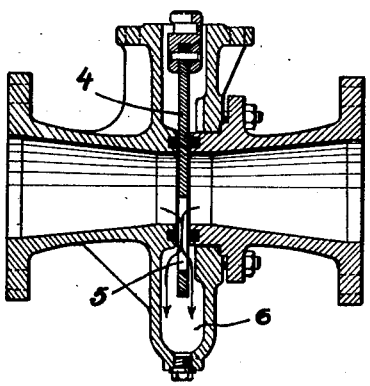
Figure 1 shows a conventional flat plate-type shut-off valve.
Figure 4:
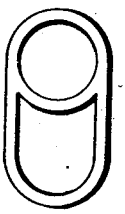
Figure 4 is a plan view of a packing removed from the valve.
Figure 3:
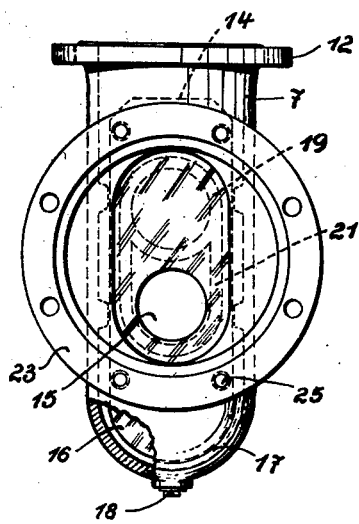
Figure 3 is a view, seen in the direction of the arrow in Figure 2, with the front part of the housing removed.
Figure 2:
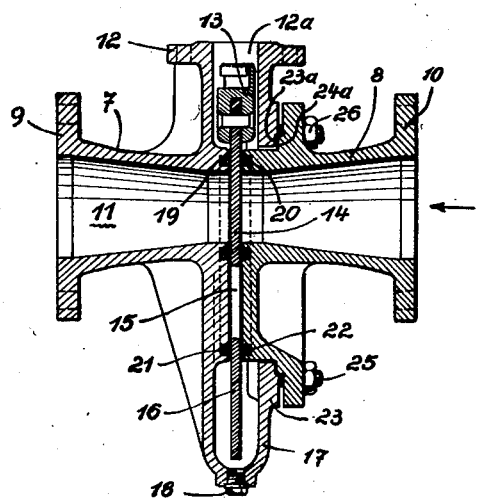
Figure 2 shows one embodiment of a shut-off valve according to the invention in vertical longitudinal section.

The shut-off valve consists of two housing sections 7 and 8, which are each provided with a connecting flange 9 and 10, respectively, and which together form a flow pipe 11. The housing section 7 is formed with an upper projection 12 having a recess 12a in which is fitted a control member 13 for opening and closing the shut-off valve, and this control member 13 is connected in any desired convenient manner with the flow obturating member in the form of a valve plate 14. This valve plate 14 has a flow opening 15 and is extended in the downward direction, as indicated at 16, the said extension projecting, in the closed position of the shut-off valve (Figure 2), into a lower housing pocket 17 which is fitted with a closure plug 18. The housing section 7 and the housing section 8 each has mounted in a recess therein an annular packing 19 and 20, respectively, in such manner that they bear in fluid-tight fashion against the plate 14.

In accordance with the invention, the annular packing 19 in the example illustrated has a U-shaped extension 21, which is housed in a suitably shaped recess of the housing section 7. An extension 22 of the packing 20, formed in a similar manner, is mounted in a corresponding recess of the housing section 8. The recesses in the housing sections 7 and 8 define a lock chamber which is sealed from the conduit 11 by the two U-shaped extensions 21 and 22 and by portions of the annular portions 19 and 20. When the valve plate member 14 is in the illustrated position closing the conduit 11, the aperture 15 is located in the lock chamber, and sealed from the conduit 11.

For convenient fitting and removal of the packing 19, 21, the housing section 7 is lengthened downwardly and is formed with a widened annular flange 23, while the housing section 8 is formed with a correspondingly shaped annular flange 24. The internal diameters of the annular flanges 23, 24 are in this case somewhat larger than the external diameter of the packings 19, 21 and 20, 22 in the direction of movement of the valve plate 14, 16. The housing sections 7 and 8 are secured together by means of threaded bolts 25 and nuts 26, it being possible for the flanges 23, 24 to be provided, in a manner known per se, with a recess 23a and a projection 24a and with an interposed packing, as will be seen from Figure 2.

By separating the two sections 7 and 8 of the housing, the packing system 19, 21 and 20, 22 can easily be replaced.

According to another constructional form of the invention (not illustrated), the packings may be arranged on both sides of and carried on the plate 14, 16 which is then expediently thickened and the packings so arranged then slide on flat, machined packing surfaces of the housing sections, whereby the same packing effect is produced.

It will be seen that with the movement of the stop plate 14, 16 from the open position into the closed position and vice versa, the bore 15 formed therein is effectively sealed off with respect to the inside of the housing or the lower housing pocket 17 throughout its movement. By this means, it is ensured that when liquids containing foreign substances are being conveyed, none of said substances can penetrate into the housing pocket and there is thus ensured a long effective life of the shut-off valve without the need for inspection.

I claim:

A valve comprising, in combination, a valve body formed with a tubular conduit for a flowing medium, and with a fluid lock chamber extending transverse to said tubular conduit and opening into the same; a valve plate member composed of a closure plate portion, a sealing plate portion and an intermediate plate portion formed with an aperture, said valve plate member being mounted in said valve body movable in transverse direction between a valve opening position in which said aperture is located in said tubular conduit and said sealing portion is located in said fluid lock chamber, and a closing position in which said closure plate portion is located in said conduit and said intermediate portion and said aperture are located in said fluid lock chamber; a pair of packing elements respectively located on both sides of said valve plate member and being secured to said valve body, each of said packing elements including an annular portion surrounding said conduit, and a U-shaped portion integral with said annular portion and being located in said lock chamber, said U-shaped portion together with said annular portion surrounding said aperture in said closed position of said valve plate member.

References Cited in the file of this patent

UNITED STATES PATENTS

| 1,049,450 | Caskey | Jan. 7, 1913 |
| 1,613,138 | Seymour | Jan. 4, 1927 |
| 1,869,741 | Du Bois | Aug. 2, 1932 |
| 2,242,467 | Hamer | May 20, 1941 |

FOREIGN PATENTS

| 209,007 | Great Britain | 1924 |
| 447,495 | Great Britain | 1936 |